United States Patent [19]

Kondo

[11] 4,030,567

[45] June 21, 1977

[54] SPRING DRUM

[75] Inventor: Toshihiro Kondo, Chofu, Japan

[73] Assignees: Toshihiro Kondo, Tokyo; Fuji Photo Film Co., Ltd., both of Japan

[22] Filed: July 8, 1976

[21] Appl. No.: 703,608

[30] Foreign Application Priority Data

July 11, 1975 Japan .............................. 50-96545

[52] U.S. Cl. ................................. 185/37; 160/313; 160/318; 185/45
[51] Int. Cl.[2] ...................... F03G 1/00; A47G 5/02
[58] Field of Search .......... 185/9, 10, 37, 39, 40 R, 185/45; 160/313, 318

[56] References Cited

UNITED STATES PATENTS

| | | | |
|---|---|---|---|
| 1,371,149 | 3/1921 | Dudek | 160/313 X |
| 1,712,594 | 5/1929 | Valentine | 160/313 |
| 1,792,771 | 2/1931 | Sevison | 160/318 |

Primary Examiner—Allan D. Herrmann

[57] ABSTRACT

A spring drum including a coil spring for rotation about a shaft is provided with a cone shaped member located within a cylindrical drum. The cone shaped member is disposed in the drum coaxially with the drum and one end of the coil spring is fixed to the cone shaped member. The coil spring is shaped to have a conical form and provided around the cone shaped member. One end of the coil spring is fixed to the drum and the other end to the shaft, or vice versa.

10 Claims, 3 Drawing Figures

SPRING DRUM

BACKGROUND OF THE INVENTION

1. Field of the Invention

This invention relates to a spring drum for driving a web-like member wound thereon, and more particularly to a spring drum adapted to wind up a shutter blind of a focal plane shutter in a photographic camera. The spring drum is first rotated overcoming the force of a spring provided therein to charge the spring force and then is released to rotate by the charged force of the spring.

2. Description of the Prior Art

The spring drum used in a focal plane shutter for winding up a shutter blind comprises a cylindrical drum member and a coil spring mounted therein one end of which is fixed to the drum member and the other end of which is fixed to a shaft on which the drum is rotatably mounted. In the conventional spring drum, the coil spring is apt to be deformed in a wave form when the spring is charged up. The deformation of the coil spring shortens the life thereof and causes the drum to rotate at irregular speeds. When the drum is rotated by the charged force of the coil spring, the deformed coil spring rubs on the internal surface of the drum and accordingly the rotation of the drum is made unstable or irregular. The irregular rotation of the spring drum is a serious problem in a photographic camera since it degrades the accuracy in control of the shutter speed.

It has been known in the art to apply a lubricant such as molybdenum disulfide or graphite to the internal surface of the drum to reduce the friction between the coil spring and the spring drum as disclosed in Japanese Utility Model Publication No. 981/1975. However, the spring drum with the lubricant only reduces the friction, but does not prevent the coil spring from being deformed. Therefore, the irregularity in the rotation of the drum cannot be completely eliminated.

Thus, it is desired to provide a spring drum which is rotated at a far more accurately uniform speed.

SUMMARY OF THE INVENTION

In view of the above described observation and description of the conventional spring drum, it is the primary object of the present invention to provide a spring drum for driving a web-like member such as a shutter blind in a focal plane shutter of a camera in which the coil spring is prevented from being deformed when the spring drum is charged up.

Another object of the present invention is to provide a spring drum for driving a web-like member such as a shutter blind at a constant speed to effect a uniform exposure of a film in a camera when the drum is employed for driving a focal plane shutter.

Still another object of the present invention is to provide a spring drum for driving a web-like member such as a shutter blind in a camera which has a long life.

The spring drum in accordance with the present invention is characterized in that the coil spring provided in a cylindrical drum is made in a conical form and a conical member is inserted between the conical coil spring and the shaft on which the drum is rotatably mounted. The conical member is axially extended along the shaft and the coil spring is wound on the conical member when the spring is charged up. One end of the coil spring is fixed to the drum the other end is fixed to the conical member in an embodiment where the conical member is fixed to the shaft. In another embodiment where the conical member is fixed to the drum and separated from the drum, one end of the coil spring is fixed to the shaft and the other end is fixed to the conical member.

DESCRIPTION OF THE PREFERRED EMBODIMENTS

Figure 1:
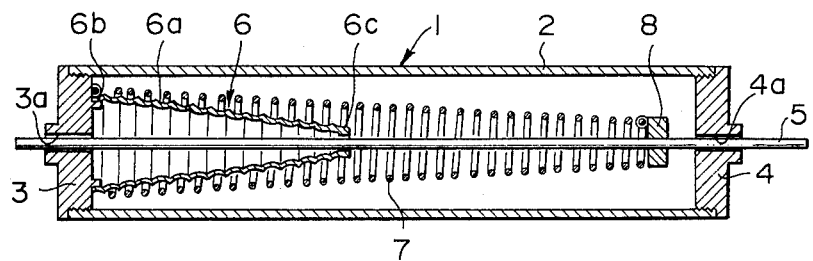
FIG. 1 is a longitudinal sectional view of one embodiment of the spring drum in accordance with the present invention.
Figure 2:
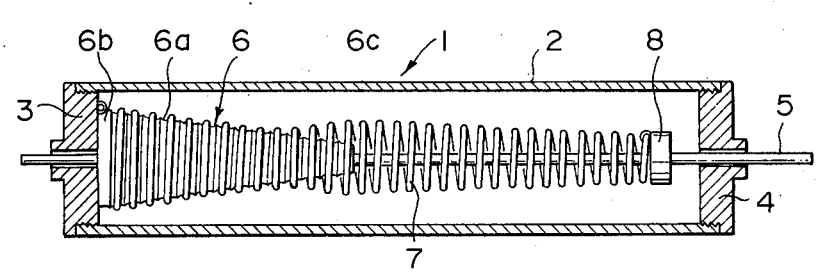
FIG. 2 is a partially sectional longitudinal view of the embodiment as shown in FIG. 1 wherein a coil spring is wound up on a conical member.

Referring to FIGS. 1 and 2, a cylindrical drum 1 comprises a cylindrical member 2 and a pair of end plates 3 and 4 fixed to the opposite open ends thereof. The end plates 3 and 4 are provided with holes 3a and 4a, respectively, for insertion of a shaft 5 extending therethrough. The end plates 3 and 4 may be removably screw engaged at the both ends of the cylindrical member 2. The shaft 5 is rotatably engaged with the holes 3a and 4a of the end plates 3 and 4 so that the drum 1 is rotatable about the shaft 5. A conical member 6 having on the other surface thereof a spiral groove 6a is retained within the cylindrical drum 1 coaxially with said shaft 5. In the embodiment shown in FIGS. 1 and 2, the conical member 6 is fixed at the bottom thereof 6b to the end plate 3. The top 6c of the conical member 6 is engaged with the shaft 5 so that the shaft 5 extends through the conical member 6 coaxially therewith. A coil spring 7 made in a conical form is provided around the conical member 6 within the drum 1. One end of the conical spring 7 is fixed to the end plate 3 or said bottom portion of the conical member 6 and the other end of the conical spring 7 is fixed to said shaft 5 by way of a fixing ring 8. The conical spring 7 covers the whole length of the conical member 6. Although the conical spring 7 shown in the drawing is considerably longer than the conical member 6, it may be of almost the same length as that of the conical member 6. The large diameter end of the conical shaped coil spring 7 is fixed to the drum 1 and the small diameter end thereof is fixed to the shaft 5. As will be noted by those skilled in the art, the spiral groove 6a is not absolutely necessary in this invention.

In operation of the spring drum is accordance with the first embodiment of the present invention as described above, the cylindrical drum 1 is first rotated against the force of the coil spring 7 in the clockwise direction when viewed from the right in FIGS. 1 and 2. Then, the large diameter part of the conical spring 7 starts to be wound up on the conical member 6, since the torque of the coil spring is weak in the large diameter part thereof and is strong in the small diameter part. Thus, the left part of the coil spring 7 is wound up on the conical member 6 and gradually the right part of the spring 7 starts to be wound up. After winding of the conical spring 7 on the conical member 6 is completed, the remaining part thereof of smaller diameter is wound up from left to right. When the drum 1 is released to allow the rotation thereof by the charged spring force, the conical spring 7 is unwound from the small diameter part to the large diameter part thereof. Therefore, the small diameter part of the spring 7 is first unwound effecting a large torque, and then the large diameter part thereof is unwound effecting a small torque. Thus, the conical spring 7 is unwound so as to effect a large torque initially and then effect a small torque. Accordingly, as a result, there is obtained a constant speed of rotation, since the speed of rotation of the drum 1 is accelerated as it is rotated.

Although in the above described embodiment the drum 1 is rotated with respect to the shaft 5, it will be noted that the shaft 5 may be rotated with respect to the drum 1 by holding the drum 1 in a fixed position. Further, it will be understood that the drum 1 may be first rotated to wind up the coil spring and then the shaft 5 may be released, or vice versa.

Figure 3:
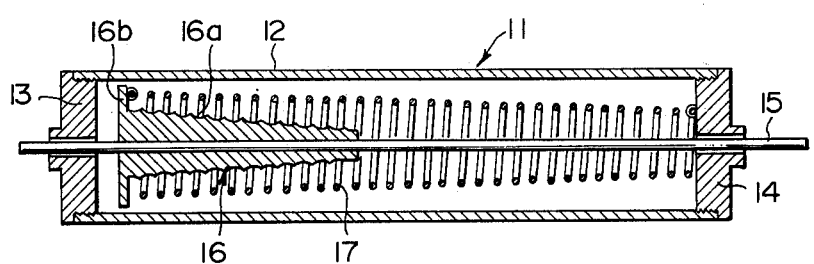
FIG. 3 is a longitudinal sectional view of another embodiment of the spring drum in accordance with the present invention.

FIG. 3 shows another embodiment of the present invention having a conical member which is not fixed to the drum 1. Referring to FIG. 3, a cylindrical drum 1 comprises a cylindrical member 12 and a pair of end plates 13 and 14 fixed to the opposite ends thereof. Within the drum 1 is provided a conical member 16 fixed to a shaft 15 which extends through the drum 11 coaxially therewith. A conical coil spring 17 is provided within the drum 11 coaxially therewith one end of which spring is fixed to the end plate 14 and the other end of which is fixed to the large diameter bottom end 16b of the conical member 16. The conical member 16 is provided on the surface thereof with a spiral groove 16a.

In this embodiment also, the drum 11 or the shaft 15 is first rotated with respect to the other to charge the conical spring 17, and then one of the two elements is released to rotate with respect to the other. The mode of operation of this embodiment is quite the same as that of the above described first embodiment and accordingly the detailed explanation thereof is omitted here.

In the embodiment where only the drum is rotatable about the fixed shaft, a web-like member such as a shutter blind to be driven by the spring drum is wound on the drum. In the embodiment where only the shaft is made rotatable and the drum is fixed, the web-like material is wound on the shaft.

I claim:

1. A spring drum for driving a web-like member by a spring force comprising in combination:
   a cylindrical drum,
   a shaft extending through said drum coaxially therewith, said cylindrical drum and said shaft being rotatable relative to each other,
   a cone shaped member having a bottom end of largest diameter and a top end of smallest diameter, said cone shaped member being provided within said drum coaxially therewith, said shaft extending through said cone shaped member, and
   a cone shaped coil spring having a bottom end of largest diameter and a top end of smallest diameter, said cone shaped coil spring being provided within said drum coaxially therewith and around said cone shaped member, the bottom end of said coil spring being fixed to the bottom end of said cone shaped member,
   one end of said coil spring being fixed to one of said drum and said shaft, and the other end of said coil spring being fixed to the other of said drum and said shaft.

2. A spring drum as defined in claim 1 wherein said cylindrical drum is held stationarily and said shaft is made rotatable.

3. A spring drum as defined in claim 2 wherein said bottom end of said coil spring is fixed to said cylindrical drum and said top end of said coil spring is fixed to said shaft.

4. A spring drum as defined in claim 2 wherein said bottom end of said coil spring is fixed to said shaft and said top end of said coil spring is fixed to said cylindrical drum.

5. A spring drum as defined in claim 1 wherein said shaft is held stationarily and said cylindrical drum is made rotatable.

6. A spring drum as defined in claim 5 wherein said bottom end of said coil spring is fixed to said cylindrical drum and said top end of said coil spring is fixed to said shaft.

7. A spring drum as defined in claim 5 wherein said bottom end of said coil spring is fixed to said shaft and said top end of said coil spring is fixed to said cylindrical drum.

8. A spring drum as defined in claim 1 wherein said shaft and said cylindrical drum are both made rotatable so that one is rotatable with respect to the other.

9. A spring drum as defined in claim 8 wherein said bottom end of said coil spring is fixed to said cylindrical drum and said top end of said coil spring is fixed to said shaft.

10. A spring drum as defined in claim 8 wherein said bottom end of said coil spring is fixed to said shaft and said top end of said coil spring is fixed to said cylindrical drum.

* * * * *